Jan. 9, 1968 J. MIZSAK 3,363,232
BRAKE LINING WEAR DETECTOR
Filed Sept. 20, 1965
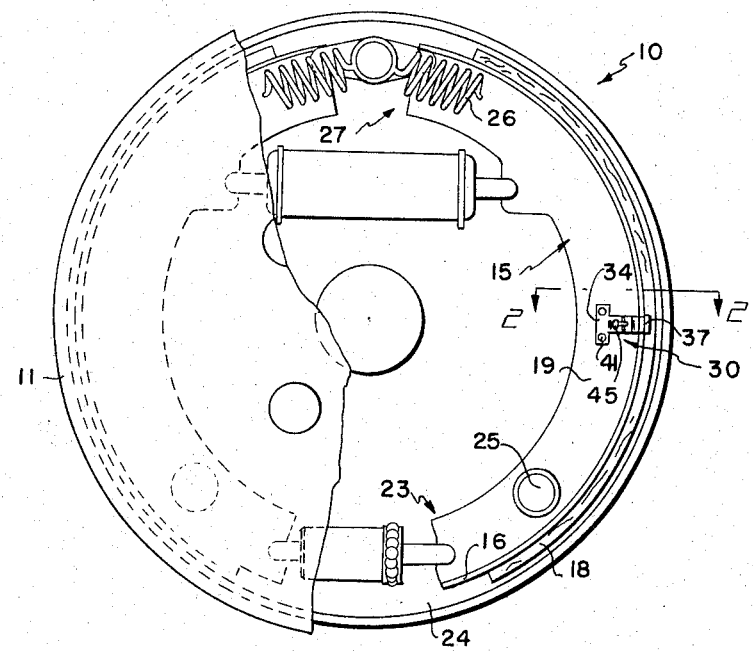
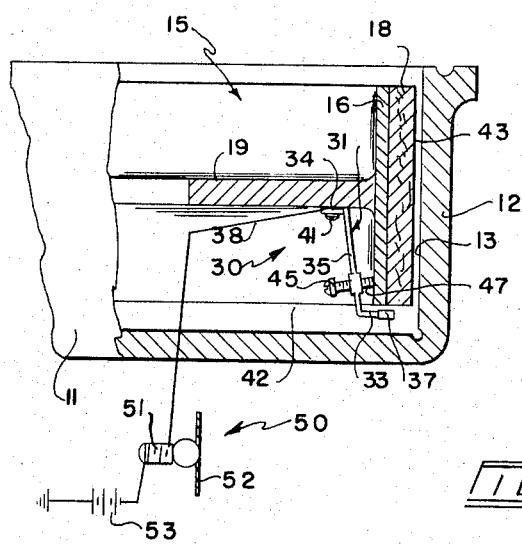
INVENTOR
JOSEPH MIZSAK
BY
Featherstonhaugh & Co.
ATTORNEYS

United States Patent Office 3,363,232
Patented Jan. 9, 1968

3,363,232
BRAKE LINING WEAR DETECTOR
Joseph Mizsak, Vancouver, British Columbia, Canada, assignor to Gordon T. Campbell, % Arrow Transfer Co. Ltd., North Vancouver, British Columbia, Canada
Filed Sept. 20, 1965, Ser. No. 488,561
3 Claims. (Cl. 340—52)

This invention relates to apparatus for detecting brake lining wear and is more particularly related to a signalling device whereby a visual or audible signal may be given to the driver of the vehicle when the brake linings have been worn to a predetermined degree.

In the operation of vehicles, the brake linings thereof, being subject to varied degrees of wear dependent upon the conditions under which the vehicles are driven, seldom wear at the same rate as between vehicles. It will be understood that some vehicles are driven in mountainous country or in cities where brakes are frequently used, whereas others may be mainly used in open country where the use of brakes is only infrequently required. A driver is never sure therefore of the condition of his brake linings and, consequently, brake linings very often wear completely away with consequent scoring of the brake drums. Unless the vehicle driver has his linings checked very frequently to ascertain their state of wear, probable damage to drums will result.

It is appreciated that lining wear detectors have heretofore been devised which, after the linings have worn to a certain predetermined extent, are so arranged as to emit an audible or visible signal whereby the driver may be warned that the linings of his vehicle must be replaced. These detection devices have generally been of rather complicated design, and have been relatively expensive to manufacture and install. To install some devices, it is often necessary to drill the brake lining and shoes to which the latter is attached, and in other instances it is necessary to use specially constructed shoes.

The present invention provides a brake lining wear detector which is inexpensive of construction and which may be installed by any mechanic or service attendant for a very little cost.

It is also, with alterations in only few cases, attachable to any make or model of car and requires no changes or adaptations to be made to the brake shoes or linings thereof.

The present invention comprises a feeler having an elongated resilient non-conductive body portion and a laterally extending electro-conductive tip portion at one end, means for rigidly securing the feeler at its other end to a shoe in a position in which the tip portion thereof normally extends radially outwardly beside the brake lining, means for moving the body portion of the feeler radially inwardly against its resilient action, said means being adjustable so as to permit the electro-conductive tip portion to be positioned at a predetermined distance inwardly of the drum engaging surface of the brake lining so as to make contact with said drum after a predetermined amount of wear of said lining, and electrical indicating circuitry connected to the tip portion and the drum actuated by said contact.

In the drawings which illustrates the invention,
FIGURE 1 is a side elevation partially in section illustrating a drum, brake shoe and lining of a typical vehicle, together with the detection apparatus of this invention as mounted thereon, and
FIGURE 2 is a section taken along line 2—2 of FIGURE 1, also showing in schematic form the electrical indicating circuitry.

Referring to the drawings, there is shown a typical brake assembly indicated generally by the numeral 10 for an automobile which includes a drum 11 secured to the automobile wheel, not shown, for rotation therewith. This drum has a wide cylindrical laterally extending flange 12, the inner surface 13 of which is finely ground and polished. There is also provided a pair of metallic brake shoes 15, each of the latter having an arcuately shaped flange 16 to the outer faces of which brake lining 18 is secured as by bonding or riveting thereto. These flanges are maintained in an arcuate shape by means of elongated radially extending and centrally located ribs 19.

The shoes 15 are each pivotally connected at their lower ends 23 to a stationary hub portion 24 of the automobile by means of rivets 25 passed through the ribs 19 and secured to said hub portion.

A tension spring 26 is secured between the opposing ribs of each of the shoes normally pivoting the shoes inwardly to draw the linings 18 out of frictional engagement with the flange 12 of the drum 11. There is normally employed a piston and cylinder arrangement extending between the upper ends 27 of the ribs by means of which, through the operation of the brake pedal of an automobile, the shoes may be pivoted apart on their rivets 25 as as to bring the brake linings of each into contact with the inner surfaces 13 of the drum flanges 12.

The brake linings 18 are normally made of non-conductive fibrous material which provides an effective frictional grip upon the inner surface 13 of the drum flanges 12, but does not wear the latter to any extent.

The brake lining wear detection apparatus herein generally accorded the numeral 30, comprises a feeler 31 which is formed of a non-conductive material, such as plastic, and which is relatively resilient. The feeler is elongated in shape, having end portions 33 and 34 bent in opposite directions laterally away from and at an obtuse angle to the elongated central or body portion 35. At the tip or end portion 34, is secured a copper contact point 37 which is preferably secured thereto by being incorporated in the feeler when the latter is moulded. A lead 38 extends from the contact point 37 through the body portion 35 of the feeler so as to prevent it contacting the revolving drum, and thereby prevent accidental contact being made therewith.

The other end portion 34 of the feeler is secured to the rib 19 by means of machine screws 41, a hole being tapped for this purpose into said rib in a suitable location to provide for the installation of the feeler. The feeler is so located that when it is securely fastened to the rib, the body portion 35 thereof will extend outwardly beyond the side edge 42 of the shoe flange 16 and, the resilient action of the material forming the feeler, will normally thrust the end portion 33 carrying the contact point 37 outwardly beyond the braking surface 43 of the brake lining 18. An adjusting screw 45 threadedly extends through a suitably tapped hole formed in the body portion 35, said screw being arranged so that its end 47 may be brought into engagement with the flange 16 of the shoe, thereby permitting radial adjustment of the contact point 37 with the brake lining 18.

Normally, by means of the adjusting screw 45, the contact point is positioned relative to the brake lining 18 so that, when the brake is operated, said contact point may only be brought into engagement with the inner surface 13 of the drum flange 12 after the brake lining 18 has worn to a certain predetermined extent. This contact engagement between the contact point and drum 11 serves in the nature of a switch for the circuitry 50, as illustrated in FIGURE 2, wherein the lead 38 is connected through an indicating light 51, the latter being installed on the instrument panel 52 of the vehicle through a power source, such as the battery 53 and ground to any part of the automobile, the latter having a ground connection by way of metal to metal engagement of all its parts with the drum 11.

The action of the detection apparatus is of course self-evident, the light 51 only being lit when contact is established between the contact point 37 and the inner surface 13 of the drum flange 12. The circuit, of course, may only be established after the brake linings have worn to a predetermined extent and not otherwise. The detection apparatus may be installed on all brake shoes, although this is not usually necessary as all brake linings on one automobile normally wear at the same rate. One of such detection apparatus on one shoe therefore usually suffices to signal when all linings require replacement.

While the present construction has been directed to a typical brake apparatus to be found in vehicles, its use, of course, is not so restricted, it being obvious that it may be usefully employed in most equipment utilizing friction brakes.

What I claim as my invention is:

1. Brake lining wear detection apparatus for a brake having an electro-conductive rotatable drum and brake lining carrying shoe, radially movable, when the brake is operated, into frictional engagement with the drum, comprising a feeler having an elongated resilient non-conductive body portion and a laterally extending electro-conductive tip portion at one end, means for rigidly securing the feeler at its other end to a shoe in a position in which the tip portion thereof normally extends radially outwardly beside the brake lining, means for moving the body portion of the feeler radially inwardly against its resilient action, said means being adjustable so as to permit the electro-conductive tip portion to be positioned at a predetermined distance inwardly of the drum engaging surface of the brake lining so as to make contact with said drum after a predetermined amount of wear of said lining, and electrical indicating circuitry connected to the tip portion and the drum actuated by said contact.

2. Brake lining wear detection apparatus for a brake having an electro-conductive rotatable drum and brake lining carrying shoe, radially movable, when the brake is operated, into frictional engagement with the drum, comprising a feeler having an elongated resilient non-conductive body portion and a laterally extending electro-conductive tip portion at one end, means for rigidly securing the feeler, at its other end to a shoe in a position in which the tip portion thereof normally extends radially outwardly beside the brake lining, a radially extending adjusting screw threadedly engaged with and extending transversely through said body portion and engageable with the shoe whereby said body portion may be flexed inwardly so as to position the electro-conductive tip portion at a predetermined distance inwardly of the brake engaging surface of the brake lining so as to make contact with said drum after a predetermined amount of wear of said lining, and electrical indicating circuitry connected to the tip portion and the drum actuated by said contact.

3. Apparatus as claimed in claim 2 in which the indicating circuitry includes an electric lamp arranged to be energized when the circuitry is actuated.

No references cited.

THOMAS B. HABECKER, *Acting Primary Examiner.*

A. H. WARING, *Assistant Examiner.*